3,637,545
PROCESS OF PREPARING METHYL METHACRYLATE POLYMERS

Ernest Fivel, Lyon, France, assignor to Plastugil (Plastiques et Elastomeres Ugine-Progil), Paris, France
Filed Jan. 3, 1969, Ser. No. 788,797
Claims priority, application France, Jan. 19, 1968, 136,319
Int. Cl. C08f 3/68, 15/18
U.S. Cl. 260—4      8 Claims

ABSTRACT OF THE DISCLOSURE

Polymers of methyl methacrylate, optionally containing a minor proportion of modifying agent, are prepared by continuous mass polymerization in the presence of an initiator and a molecular weight regulator, the reaction mixture being passed in a lamellar flow between diathermic walls at a constant temperature of 145–165° C. and polymerized to a conversion rate of 40–60%. The mixture thus obtained is flash devolatilized above 200° C. to recover the polymer.

---

Figure 1:
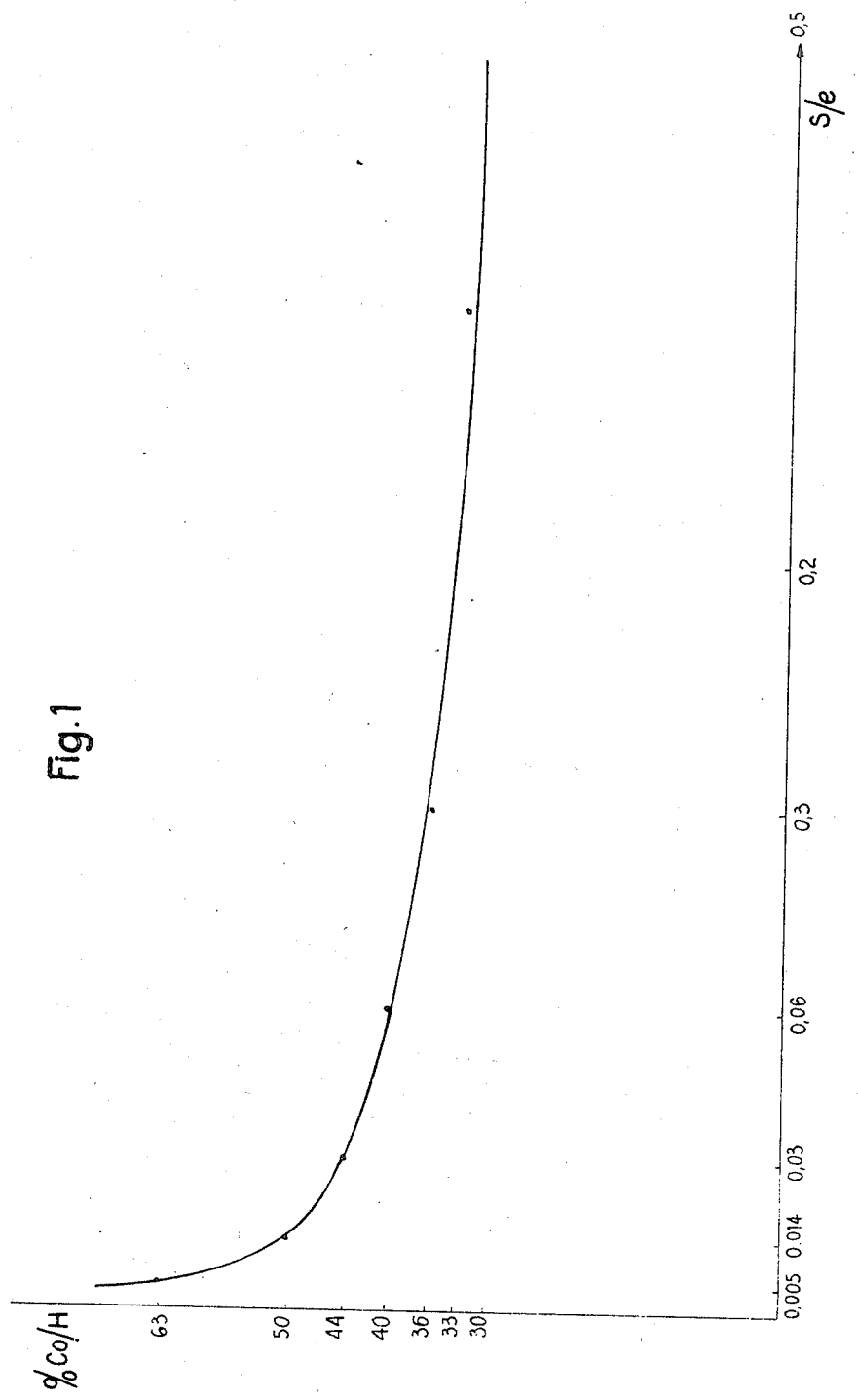

The present invention relates to the polymerization of methyl methacrylate, alone or in admixture with a minor proportion of modifying agent, into mouldable or extrudable thermoplastic materials designated under the generic term of "methyl polymethacrylate" which includes the varieties having either improved fluidity on moulding, or improved impact resistance, or, finally, improved behavior with respect to heat, as a function of the selected modifying agent. The term modifying agent as used herein includes both a comonomer or comonomers as will be hereinafter described.

Difficulties were encountered with the various usual methods for producing both suitable grades of polymers of this type useful for moulding and extrusion having satisfactory mechanical properties, and a sufficient polymerization rate to effect the polymerization within an acceptable period of time.

It is known that the mouldability and the mechanical properties of polymers are conditioned by their mean molecular weight. For all these properties to be satisfactory for a methyl methacrylate polymer, it is generally acknowledged that its mean molecular weight, expressed in "K-Wert" or K value according to Fikentscher (Cellulose Chemie 13, 58 (1932)) should be between about 35 and 45.

Now, such a K value, involving high polymerization temperatures, is very difficult to obtain under acceptable industrial conditions for methyl methacrylate polymers.

When use is made of aqueous emulsion polymerization, the resulting polymer is contaminated with various impurities introduced into the reaction mixture. On the other hand, mass polymerization of methyl methacrylate under the sole influence of heat is difficult to effect. To attain a satisfactory rate of polymerization, it is necessary to use an initiator combined with a regulator acting on the molecular weight to limit same. This, in turn, leads to a difficulty. Indeed, since the polymerization reaction is reversible, the ultimate product should be free from any material having a catalytic effect. The presence of such a material or of residues thereof may cause a depolymerization resulting in surface defects, a reduction in the mechanical properties and yellowing of the moulded products on ageing.

The problem is further complicated by the fact that the polymerization method should not only proceed at a satisfactory reaction rate and insure the production of polymers having suitable mechanical and thermal stability properties, but also result in polymers having good transparency characteristics and which are free from colour.

Commercially available methyl methacrylate polymers are seldom total homopolymers. Generally, they contain a minor proportion of another monomer for the purpose of modifying their properties, particularly fluidity on moulding and behavior to heat. Thus, when use is made of mass polymerization with complete conversion of the monomers, there are not obtained homogeneous copolymers of constant composition, but mixtures of copolymers of different compositions because of the reaction rates inherent to each monomer which lead to a more rapid depletion of one of these in the reaction mixture. This series of copolymers having different chemical compositions leads to a final product which, instead of being transparent, is sometimes optically cloudy.

When an elastomer, rather than a monomer, is used as modifying agent for the purpose of improving impact resistance, total conversion mass polymerization has no substantial influence on the transparency of the polymer which is normally cloudy. In contrast, such polymerization results in a polymer having an unusually high viscosity having a detrimental influence on the properties of the product and leading to a difficult travel of the latter through the reactor.

Thus, to comply with the various requirements set forth above, polymerization should be effected, in the first place, at high temperatures to obtain an acceptable K value while avoiding the Trommsdorff effect in the course of polymerization. This effect is characterized by a substantial increase in molecular weight and by a sharp increase of the reaction rate which make the reaction uncontrollable.

However, such high temperature polymerization should be of limited duration, since otherwise the depolymerization phenomenon may be promoted and one may ultimately obtain a result opposite to that which is desired. This is a particularly substantial risk in total conversion mass polymerization processes.

Taking such difficulties into account, no truly suitable solution that would make it possible to comply with these combined requirements has yet been found.

Therefore, the invention relates to a method for the continuous mass polymerization of methyl methacrylate, optionally containing a minor proportion of modifying agent, in the presence of an initiator-regulator system which overcomes such drawbacks and constitutes a satisfactory compromise between the conflicting requirements mentioned above. This result is obtained by carrying out the polymerization at high constant temperature, with a limited conversion rate but with a high conversion speed due to a thin layer reaction, the polymerization being followed by a vacuum devolatilization step at a still higher temperature, but within a very short time.

Thus, the method according to this invention is characterized in that it comprises continuously passing between two diathermic walls a thin layer of a mixture of monomeric methyl methacrylate optionally containing a modifying agent and of a molecular weight initiator-regulator system, during a reaction time of about 20–80 minutes, up to a conversion rate of 40–60% into methyl polymethacrylate, at a constant temperature comprised within about 145° C. and 165° C., the ratio $S/e$ between the heat exchange surface S of the two diathermic walls and the thickness $e$ of the mixture passing therebetween per unit volume of said mixture having a value of at least 0.005 cm.$^{-2}$ in CGS units and preferably comprised between 0.014 and 0.03 cm.$^{-2}$, and then submitting the reaction mixture discharged from the space comprised between said walls to a flash devolatilization step in vacuo at a temperature above 200° C. to remove the unreacted monomer and destroy the initiator.

A detailed discussion of the various characteristics of the present method will be given below.

The conversion rate was determined with respect to the following considerations. It should not be too low since otherwise insufficient production would result. Also, it should not be too high since this would extend the reaction time and might cause a depolymerization and also, when using a modifying agent, might result in non-homogeneous insufficiently transparent or too viscous products. With both these requirements in mind, a conversion rate of 40–60% was found to give the best results.

Under the reaction conditions contemplated, this rate is attained within a time of 20 minutes to 80 minutes, and preferably of one hour.

The polymerization temperature range of 145–165° C. was determined experimentally as satisfactory.

Indeed, taking into account the presence of a molecular weight regulator, it makes it possible to obtain polymers having the desired K value comprised between 35 and 45. In addition, it is compatible with a convenient use of the initiator (minimum rate of use of the latter while permitting ready destruction thereof), with the need to obtain an acceptable polymerization speed and as low as possible a viscosity of the reaction mixture, and also with the production of a colour-free polymer which does not tend to turn yellow with time and retains its good properties on ageing.

It is understood that the selection of the initiator and of the regulator is not indifferent to attain the best results.

While peroxides are generally useful initiators, those which possess maximum efficiency within the above cited temperature range are preferred. Thus, said preferred initiators are those having a decomposition temperature above this temperature range although it should not be too high, so as to permit their destruction during the devolatilization step. Satisfactory materials within such definition are cumene hydroperoxides, tert-dibutyl peroxide and dicumyl peroxide. Polymeric peroxides formed in situ in a prior step by heating the monomeric methyl methacrylate containing dissolved oxygen are also acceptable initiators. This is all the more so because this dissolved oxygen gives also with the mercaptans—used as regulators—sulfinic acids which constitute thus interesting initiators, the decomposition products of which are colour-free. As indicated, 0.01 to 0.1 weight percent of initiator will be used, with respect to the methyl methacrylate (MMA).

The molecular weight regulators used should be highly efficient at the low rate of use comprised between 0.1 and 1 weight percent with respect to MMA. Particularly useful in this respect are mercaptans, as indicated above, and particularly n-dodecylmercaptan, tert-dodecylmercaptan, methylmercaptan and butylmercaptan.

The determination of the thickness of the reaction layer and, therefore, of ratio $S/e$ is dependent on the reaction kinetics which, in turn are a function of the efficiency of the initiator-regulator catalytic system (nature and percentage). The more efficient the latter, the thinner the layer should be to permit ready control of the reaction conditions. This layer thickness is also dependent on the temperature and the reaction time. An optimum value should be established in view of these various factors.

The manner in which this determination is effected will be described hereinunder.

On completion of the polymerization, the separation of the polymer from the unconverted monomer is carried out in a conventional vacuum devolatilization apparatus in which the dwell time of the product is very brief. This devolatilizer operating at a much higher temperature (about 200° C.–230° C.) than the polymerization apparatus makes possible the total decomposition of the initiator or of its residual products, whose life is very short at the temperature used, and this without producing a substantial depolymerization of the polymer, because of the very short dwell time, of the order of 30 to 60 seconds.

For this same reason, the devolatilizer is connected to the polymerizer and to the polymer extraction apparatus by lines as short as possible, for the purpose of reducing the dwell time, at high temperature, of the polymer. Thus, the devolatilization carried out according to the invention may be termed "flash" devolatilization.

The polymer resulting from the devolatilization step exhibits, in addition to a suitable K value, a very narrow molecular weight distribution imparting thereto optimum mechanical properties. As mentioned above, the method according to the invention is applicable both to the homopolymerization of methyl methacrylate and to the polymerization of the latter in the presence of a minor proportion, generally not above 15% by weight with respect to the weight of the mixture, of a modifying agent. This modifying agent may consist of an alkyl acrylate or methacrylate, to obtain methyl polymethacrylates having good moulding fluidity, it may also consist of acrylic acid, an alkyl-acrylic acid such as methacrylic acid, an unsaturated dicarboxylic acid or an anhydride of such an acid (particularly maleic and fumaric), for the purpose of improving the behavior to heat of the resulting methyl polymethacrylates. Due to the constant temperature process with limited conversion rate, such copolymers exhibit, in addition, a narrow chemical composition distribution and a very good optical transparency. The modifying agent may also consist of an elastomer, a natural or synthetic rubber such as SBR for example, to obtain methyl polymethacrylates having improved impact resistance. Due to the constant temperature process with limited conversion rate it is possible in some cases, and according to the elastomer selected, to obtain transparent impact resistant grades. Moreover, the limited conversion rate obviates the drawbacks, insernt to the total conversion process, of too high an interpolymerization of the elastomer with the methyl methacrylate and of changes in the elastomer due to cross-linking, this being reflected both by a most substantial increase in the viscosity of the polymer which then becomes most difficult, if not impossible, to carry through the polymerizer and by a loss of the properties of this same polymer.

The manner in which the optimum thermal exchange conditions, i.e., the range of useful $S/e$ ratios, were determined will now be examined. For this purpose, a series of experiments was carried out at a constant polymerization temperature of 160° C. selected within the temperature range previously determined as satisfactory.

In a first step, the $S/e$ ratio was varied, the initiator concentration being maintained constant. Then, for various given $S/e$ ratios, the initiator concentration was varied. The hourly production rate was evaluated in each case, it being understood that the conversion rate into the polymer was maintained at a value at most equal to 60%, and preferably comprised between 40 and 60%, taking the above factors into account.

In these various experiments, the initiator used is cumene hydroperoxide and the regulator, n-dodecylmercaptan, is used in an amount of 0.3% by weight, with respect to the MMA. The results of these experiments are summarized in the table below. In the table, the $S/e$ ratios per unit volume, which correspond to the reciprocal of a square length, are reported in CGS units, i.e., in cm.$^{-2}$.

| $S/e$, cm.$^{-2}$ | Initiator, weight percent of MMA | Reaction time, minutes | Conversion rate, percent | Hourly production rate, percent |
|---|---|---|---|---|
| 0.5 | 0.01 | 60 | 30 | 30 |
| 0.2 | 0.01 | 60 | 33 | 33 |
| 0.1 | 0.01 | 60 | 36 | 36 |
| 0.06 | 0.01 | 60 | 40 | 40 |
| 0.03 | 0.01 | 60 | 44 | 44 |
| 0.014 | 0.01 | 57 | 48 | 50 |
| 0.005 | 0.01 | 57 | 60 | 63 |
| 0.5 | 0.01 | 60 | 30 | 30 |
| 0.5 | 0.02 | 60 | 46 | 46 |
| 0.5 | 0.03 | 60 | 48 | 48 |
| 0.5 | 0.04 | 50 | 50 | 60 |
| 0.5 | 0.08 | 41 | 60 | 88 |
| 0.06 | 0.01 | 60 | 40 | 40 |
| 0.06 | 0.02 | 63 | 60 | 56 |
| 0.06 | 0.03 | 52 | 60 | 69 |
| 0.06 | 0.04 | 43 | 60 | 80 |
| 0.06 | 0.08 | 30 | 60 | 120 |
| 0.014 | 0.01 | 60 | 50 | 50 |
| 0.014 | 0.02 | 50 | 60 | 72 |
| 0.014 | 0.03 | 42 | 60 | 85 |
| 0.014 | 0.04 | 38 | 60 | 98 |
| 0.014 | 0.08 | 25 | 60 | 148 |
| 0.005 | 0.01 | 57 | 60 | 63 |
| 0.005 | 0.02 | 41 | 60 | 87 |
| 0.005 | 0.03 | 36 | 60 | 106 |
| 0.005 | 0.04 | 29 | 60 | 125 |
| 0.005 | 0.08 | 21 | 60 | 180 |

It is apparent from this table with a low initiator content—the most interesting practical solution—the $S/e$ ratio should not be higher than about 0.06 to give an acceptable hourly production rate, a lower ratio improving this rate.

FIG. 1 of the accompanying illustrates the data of the first part of the table, expressing the hourly production rate in percent as a function of the $S/e$ ratio, for a low initiator content of 0.01% with respect to methyl methacrylate.

The $S/e$ ratio in cm.$^{-2}$ was plotted along the abscissa and the hourly production rate (percent Co/H) was plotted along the ordinate.

The minimum permissible $S/e$ ratio may be deduced from this curve, in view of the fact that the initiator content used in this case is the lowest. One may see that this curve includes a portion asymptotic to the axis of the ordinates. For the reaction to be controllable, one should avoid operating too distinctly on the asymptotic portion. This corresponds to $S/e \geqslant 0.005$, this ratio being preferably comprised within the range 0.014–0.03.

Figure 2:
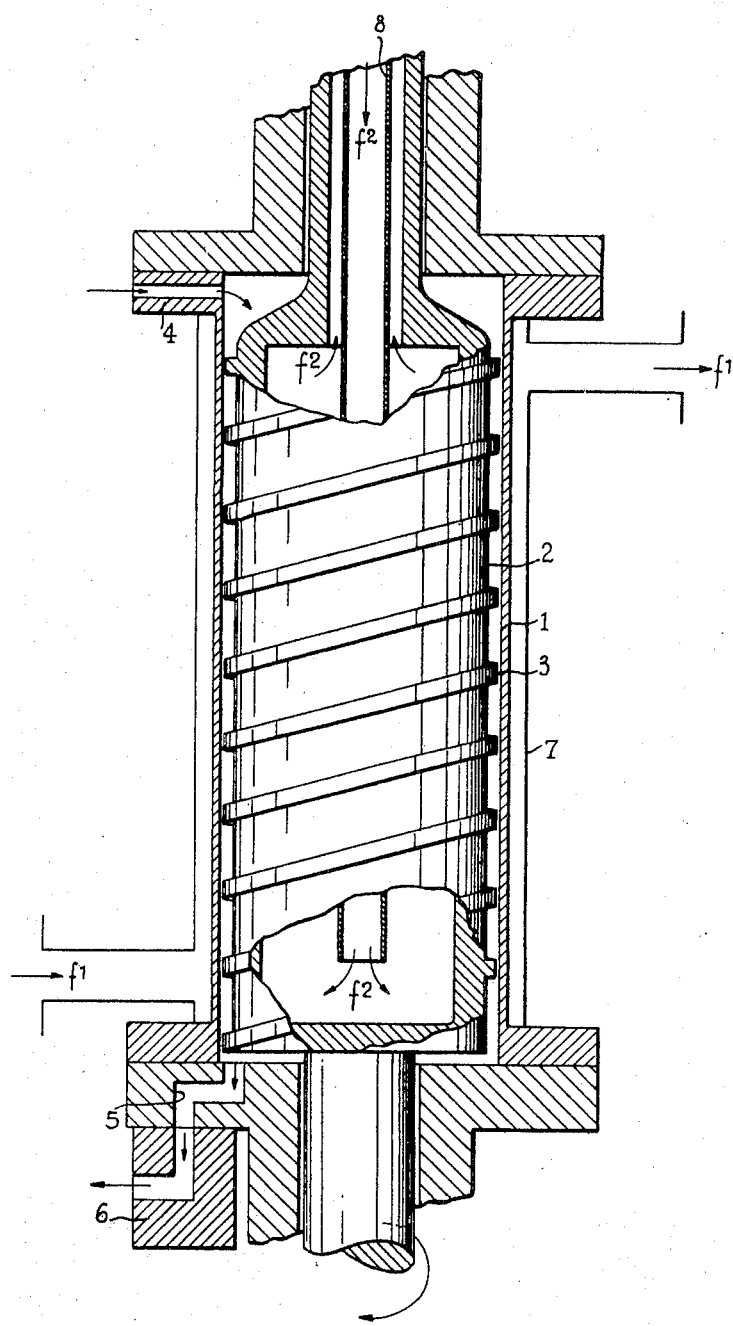

To obtain ratios of this order, a suitable apparatus should be used to carry out the polymerization, advantageously consisting of a polymerizer having an annular space for the passage of the monomers adjusted at the appropriate value. Such a polymerizer is shown in longitudinal section with a part cut away in FIG. 2 of the accompanying drawing. It comprises two concentric cylinders 1 and 2, the inner cylinder 2 being rotatable within cylinder 1 and being provided with a helical thread or rib 3 which causes the monomer to travel through the annular space provided between the cylinders.

The monomer is injected at 4 and issues from the apparatus at 5, an extracting screw pump 6 being provided, if desired. Cylinder 1 is surrounded by a jacket 7 in which a heat regulating fluid circulates in the direction of arrows $f^1$. Cylinder 2 is hollow, and it is also possible to inject therein, through a pipe 8, heat regulating fluid circulating in the direction of arrows $f^2$. A simple calculation shows that in this case the ratio $S/e$ is equal to $$\frac{2}{(R-R')^2}$$

in which R and R' are the radii of the inner and outer cylinders of the apparatus, respectively. It is possible to deduce therefrom that $R-R' \leqslant 20$ cm. The lower limit of space $R-R'$ is, for its part, determined by practical considerations, since it is hardly possible to descend below 0.2 cm.

As a function of the nature and of the amount of the initiator used, one will operate with an annular space comprised between such extremes, the spaces used being preferably comprised between 8 and 12 cm., corresponding to an $S/e$ ratio comprised between 0.03 and 0.014, respectively.

Since the addition of a minor proportion of modifying agent does not modify substantially the kinetics of the reaction, the results derived from the above mentioned experiments apply also to the production of copolymers and interpolymers prepared with modifying agents.

All polymers, copolymers or interpolymers obtained by the process according to the invention acquire, precisely on account of this process, particular characteristics set forth hereinabove, which make these materials true new industrial products.

The following examples illustrate the invention without, however, limiting same.

EXAMPLE I

The reactor, whose reaction chamber consists of a 60 mm. annular space, is filled with methyl methacrylate to which have been added, by weight, 0.01% cumene hydroperoxide and 0.3% n-dodecylmercaptan; the temperature is increased to 160° C. at a pressure of 16 kg./cm.² until a conversion rate of 40% is attained. The mixture of methyl methacrylate and of its initiator system is then continuously fed to the reactor and still under pressure, so as to maintain the conversion rate of 40% at a constant value. The product is then passed into a devolatilizer heated at 220° C. from which is removed the monomer which is then recycled. The dwell time in the reactor is 66 minutes. A product is extruded, having a notched Izod impact value of 1.25 kg./cm./cm., a tensile strength of 690 kg./cm.² and a K-Wert of 38.

EXAMPLE II

The reactor, whose reaction chamber consists of a 90 mm. annular space, is filled with a mixture of methyl methacrylate and ethyl acrylate in proportions of 95/5, by weight, containing, with respect to the weight of MMA, 0.02% of tert-dibutyl peroxide and 0.3% of n-dodecylmercaptan. The temperature is increased to 150° C. at a pressure of 14 kg./cm.², until a conversion rate of 52% is reached. The above-defined mixture of monomers and of catalytic system is then continuously fed to the reactor, still under pressure, so as to maintain the conversion rate of 52% at a constant value. The product is then passed to a devolatilizer heated at 220° C., from which are removed the monomers which are then recycled. The dwell time in the reactor is 56 minutes. A product is extruded having a notched Izod impact value of 1.15 kg./cm./cm., a tensile strength of 670 kg./cm.² and a K-Wert of 42.

EXAMPLE III

The reactor, whose reaction chamber consists of an 80 mm. annular space, is filled with a mixture of methyl methacrylate and methacrylic acid in proportions of 95/5 by weight, containing, with respect to the weight of MMA, 0.02% of dicumyl hydroperoxide and 0.4% of n-dodecylmercaptan. The temperature is increased to 145° C. at a pressure of 14 kg./cm.², until a conversion rate of 57% is reached. The mixture of monomers and of the above defined catalytic system is then continuously fed to the reactor, still under pressure, to maintain the conversion rate at a constant value of 57%. The product is then passed to a devolatilizer heated at 220° C. from which are removed the monomers which are then recycled. The dwell time in the reactor is 65 minutes. A product is extruded having a notched Izod impact value of 1.2 kg./cm./cm., a tensile strength of 650 kg./cm.², a heat distortion temperature of 92° C. and a K-Wert of 43.

EXAMPLE IV

Five parts of rubber are dissolved in 95 parts of methyl methacrylate, with stirring, during 4 hours. To the mixture are then added, with respect to the weight of MMA, 0.03% of cumene hydroperoxide and 0.3% of n-dodecyl-mercaptan. The reactor, whose reaction chamber consists of an 80 mm. annular space, is then charged. The temperature is increased to 160° C. at a pressure of 16 kg./cm.$^2$, until a conversion rate of 50% is reached, which gives an elastomer content of 10% in the final product. The above defined mixture of monomer, elastomer and catalytic system is then continuously fed to the reactor so as to maintain the conversion rate at a constant value of 50%. The product is then passed to a devolatilizer heated at 220° C., from which is removed the methyl methacrylate which is then recycled. The dwell time in the reactor is 50 minutes. A product is extruded having a notched Izod impact value of 3.4 kg./cm./cm. and a tensile strength of 510 kg./cm.$^2$.

I claim:
1. Process for the continuous mass polymerization of methyl methacrylate optionally containing a comonomer or comonomers selected from the group consisting of alkyl acrylates and methacrylates, acrylic acid, alkyl-acrylic acids, unsaturated dicarboxylic acids and their anhydrides, and elastomers in amounts of up to about 15% of the combined weight of the methyl methacrylate and comonomer mixture, said method comprising the steps of:
   (a) forming a reaction mixture of monomeric methyl methacrylate, optionally containing said comonomer or comonomers, an initiator and a molecular weight regulator, said initiator and said regulator being present in respective amounts of 0.01–1% and 0.1–1% by weight of methyl methacrylate;
   (b) shaping a portion of said reaction mixture into a continuous sheet configuration having a thickness in the range from 0.2 to 20 centimetres;
   (c) continuously feeding the remaining portion of said reaction mixture into one end of said sheet configuration while withdrawing material from the other end thereof;
   (d) continuously contacting both faces of said sheet configuration throughout their entire areas to transfer heat away therefrom;
   (e) adjusting the rate of heat transfer away from said sheet configuration to maintain the temperature of all of said mixture within said configuration including polymerized portions thereof at a predetermined constant value within the range from 145° C to 165° C.;
   (f) adjusting the rate of said feeding to cause passage of any specific portion of said mixture from said one end of said configuration to the other end thereof in a period of from about 20 minutes to 80 minutes whereby about 40 to 60% of said specific portion is reacted to produce a polymer, and
   (g) submitting said material withdrawn from said other end of said sheet to a flash devolatilizing step under a vacuum at a temperature above 200° C. to distill off the unreacted monomeric methyl methacrylate and destroy the initiator, thereby recovering said polymer.

2. Process as claimed in claim 1, wherein said initiator is a peroxide.

3. Process as claimed in claim 2, wherein said peroxide is selected from the group consisting of cumene hydroperoxides, di-tert.butyl peroxide, dicumyl peroxide and peroxides formed in situ by preliminary heating of methyl methacrylate containing dissolved oxygen.

4. Process as claimed in claim 1, wherein said molecular weight regulator is a mercaptan.

5. Process as claimed in claim 4, wherein said mercaptan is selected from the group consisting of n-dodecyl mercaptan, tert.dodecyl mercaptan, methyl mercaptan and butyl mercaptan.

6. Process as claimed in claim 1, wherein the rate of said feeding is adjusted to cause said passage in a period of about 1 hour.

7. Process as claimed in claim 1, wherein the thickness of said continuous sheet configuration is between about 8 and 12 cm.

8. Process according to claim 1, wherein said configuration of said sheet is in the form of a cylindrical helix.

References Cited
UNITED STATES PATENTS

| | | | |
|---|---|---|---|
| 3,141,868 | 7/1964 | Fivel | 260—85.5 |
| 3,234,303 | 2/1966 | Bild et al. | 260—89.5A |
| 3,252,950 | 5/1966 | Terenzi et al. | 260—89.5 A |

HARRY WONG, JR., Primary Examiner

U.S. Cl. X.R.

260—78.5, 80.81, 86.1, 89.5, 885